Nov. 3, 1931.  C. E. McMULLIN  1,830,554
BOLT
Filed Dec. 5, 1929
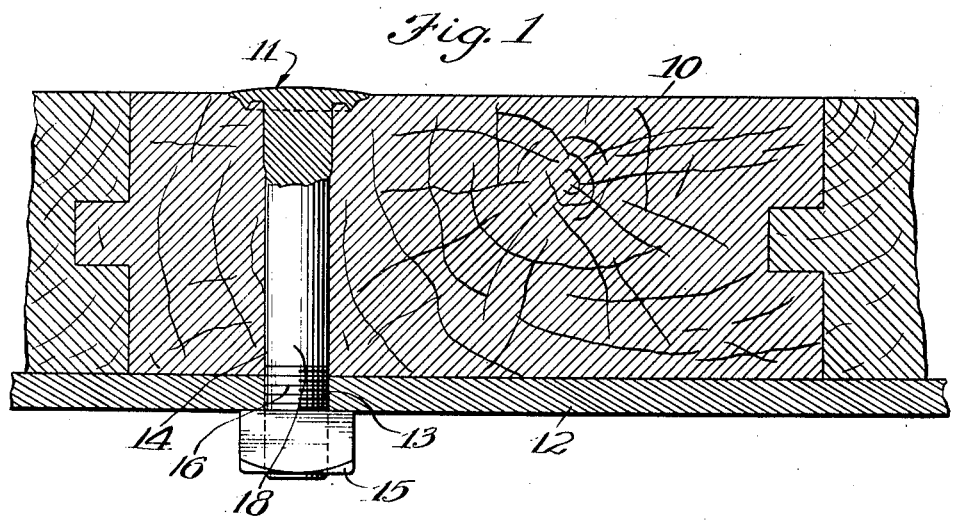
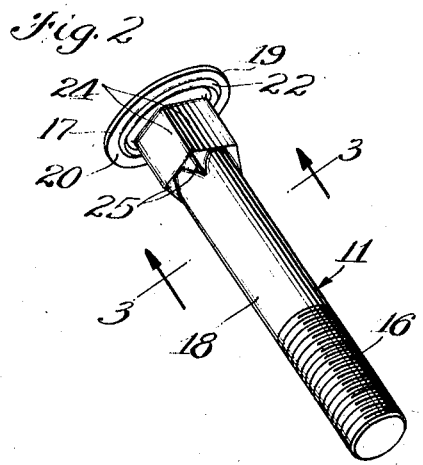
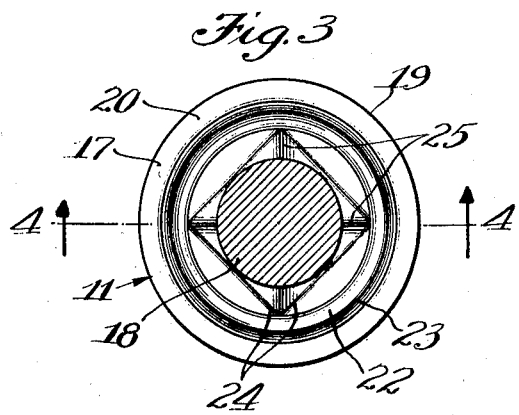
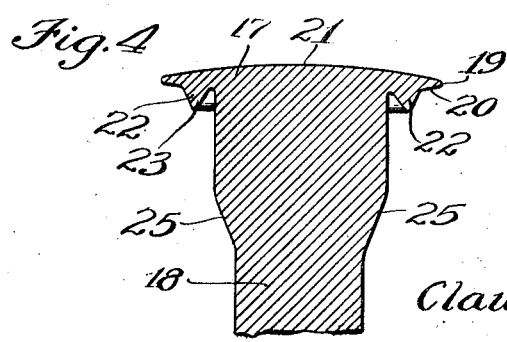
Inventor:
Claud E. McMullin
By Williams, Bradbury, McCaleb
& Hinkle, Attys.

Patented Nov. 3, 1931

1,830,554

UNITED STATES PATENT OFFICE

CLAUD E. McMULLIN, OF ST. LOUIS, MISSOURI, ASSIGNOR TO MacLEAN-FOGG LOCK NUT CO., OF CHICAGO, ILLINOIS, A CORPORATION OF ILLINOIS

BOLT

Application filed December 5, 1929. Serial No. 411,904.

The present invention relates to bolts and is particularly concerned with improvements in bolts for use in railway freight and passenger, and industrial cars and the like.

While the present invention is of particular importance in connection with railway freight cars, it should be understood that the present bolt is capable of universal use and will be found advantageous wherever it is desirable to effect a waterproof or watertight seal about the head of the bolt, or where it is desirable to utilize any of the other novel features of the bolt.

The railway freight cars of the prior art, which have their wooden sheathing secured by ordinary bolts, such as carriage bolts, are subject to the disadvantage that the wooden sheathing must be countersunk to receive the heads of the carriage bolts. In countersinking for the heads of the bolts, the edges around the countersunk holes are nearly always ragged and splintered. These ragged and splintered edges are the cause of loss and damage to lading contained in sacks, such as flour, sugar, cement, etc. It is, therefore, a desideratum in freight cars, that all fastening devices for sheathing, floors and any other portion of cars where bolts extend from inside to outside of car, they be installed with the heads flush with the surface of the wood. It also should be borne in mind that countersinking of the wood cuts a great deal of it away, thus materially decreasing its strength.

Another disadvantage of the prior art bolts is that water leaks in past the heads of the bolts so that the lumber soon begins to rot beneath the bolt head. The sheathing becomes loose, holes are formed in the sides and floors of the car, permitting leakage of the cargo such as grain, etc. The water which leaks past the bolt heads often causes damage to the cargo.

One of the objects of the invention is the provision of an improved car construction including water-tight fastening devices for sheathing, flooring, roofing and other portions of cars where bolts extend from inside to outside, for the purpose of eliminating looseness and rotting of the lumber about the bolts.

Another object is the provision of an improved bolt having a head adapted to be drawn into sealing engagement with the lumber, so as to eliminate the difficulties brought about by leakage of water past the head of the bolt.

Another object is the provision of a bolt of the class described, in which the head is adapted to be drawn substantially flush with the wood surface, thus eliminating the operation of countersinking, which is necessary with carriage and other types of sheathing or flooring bolts, and to aid in effecting a waterproof seal about the head of the bolt.

Another object is the provision of a bolt for use in coal mine pit and conveying cars and the like. Cars of this class are fastened with carriage bolts, the heads of which project inside of the cars. In dumping the load, a great deal of coal is crushed and broken up by these carriage head bolts. This degrades the coal. With the use of the improved bolt, the inside surfaces of the cars would be smooth, thus eliminating breakage and degrading.

Other objects and advantages of the invention will be apparent from the following description and from the accompanying drawings, in which similar characters of reference indicate similar parts throughout the several views.

Referring to the single sheet of drawings:

Fig. 1 is a sectional view taken through a part of a refrigerator car showing tongue and groove flooring secured with a bolt constructed according to the present invention;

Fig. 2 is a view in perspective of the bolt;

Fig. 3 is a sectional view taken on the line 3—3 of Fig. 2;

Fig. 4 is a sectional view of the bolt taken on the plane of the line 4—4 of Fig. 3.

Referring to Fig. 1, showing an installation exemplary of one of the many forms in which the invention may be utilized, the flooring or sheathing 10 is secured in place by a plurality of bolts 11, which also pass through metal sills, braces or framework 12. The present bolts may be used with any kind of lumber, but where a tight construction is desirable, some form of tongue and groove lumber is usually employed.

The metal supporting member 12 is provided with a bore 13 of sufficient size to receive the bolt 11, and the lumber may be bored with ordinary cylindrical holes 14 of the same size, or preferably slightly smaller than the bolt 11. Any form of nut 15, or other threaded member, may be employed which is capable of cooperating with the complementary threaded portion 16, formed on the bolt 11, and it should be understood that if desired, the threaded bore may be formed in the bolt, and the nut provided with a male threaded portion.

Referring to Fig. 2, the bolt 11 which is illustrated in perspective in this figure, preferably includes a head 17, a cylindrical portion 18, and a threaded portion 16. The head 17 is preferably circular in shape and tapered in thickness from the body of the bolt outward toward the outer edge 19 of the head. Thus, the lower surface 20 of the head slopes upward slightly away from the body 18. The top surface 21 of the head is preferably, but not necessarily, convexly curved, the curvature being slight in order to prevent the formation of projections on the surface of the lumber, but the curvature being sufficient to give sufficient body to the head for the necessary strength. It should be understood, however, that the shape of the upper surface of the head may be changed while still utilizing the other features of the present invention, and the head may be made entirely flat at the surface 21, if desired.

The lower surface 20 of the head is preferably provided with an integral annular ridge 22, extending completely about the head, and the ridge 22 is preferably of substantially V-shaped cross-section with a slightly curved surface 23 at the apex of the ridge. The apex of the ridge 23 defines a circle, the center of which preferably lies in the axis of the bolt, so that the ridge may be spaced sufficiently from the body of the bolt to effect a sealing engagement with the lumber 10 at a point spaced from the bore 14. It is not necessary that the ridge 22 actually cut or sever the lumber, and since bolts are preferably formed by the use of dies, the apex 23 of the ridge is not sharpened, but is provided with a slightly curved surface so that the ridge 22 is adapted to compress and deform the adjacent parts of the lumber to effect a sealing engagement without actually cutting the fibers of the lumber at this point.

It is highly desirable also that the sealing ridge on the head 17 remain in engagement with the same portion of the lumber which it engages and deforms in the sealing operation, without rotation of the bolt because such rotation might effect a misalignment of the initial groove made, and the final location of the adjacent part of the ridge. That is, the best results will be accomplished by drawing the head 17 with its ridge 22 axially into the lumber 10 without permitting rotation of the bolt. If such rotation were permitted and the ridge were not located with the center of its circle in the axis of the bolt, any rotation of the bolt would throw the ridge into an eccentric position with part of the groove, and eventually the rotation of the bolt in the securing operation might form a groove wider than the ridge.

For this purpose, and also for the purpose of facilitating the tightening of the nuts on the bolts, the bolts are preferably provided with a non-circular shoulder 24 located adjacent the head 17, and the non-circular shoulder 24 may be made larger than the body 18 of the bolt so as to assist in the function of producing a compression of the lumber fibers about the head. The non-circular shoulder 24 in the bolt illustrated is square in cross-section, its transverse dimension being substantially equal to or slightly greater than the diameter of the body 18. In order to facilitate the drawing in of the enlarged shoulder 24, the bolt is provided with tapered portions 25 which extend from each of the corners of the shoulder 24 to the cylindrical body portion 18.

The operation and installation of the present bolt is as follows:

The lumber 10 is preferably provided with a bore 14 which is slightly smaller than the body 18 of the bolt to provide a close fit, and the bolt 11 may be driven into the bore 14 until the shoulder 24, or at least a portion thereof, is embedded in the bore 14. The nut 15 may then be placed upon the threaded nut 16 of the bolt, and the nut threaded home by means of a wrench or other tool, during which operation, the bolt 11 will be gradually drawn into the bore 14, the head 17 embedding itself in the surface of the lumber about the bore 14 until the head is substantially flush with the surface of the lumber.

During this operation, rotation of the bolt is prevented by the non-circular shoulder 24, and the annular ridge 22 is drawn into the fibers of the lumber, deforming the fibers and compresing them to form a sealing ring about the under side of the bolt head.

The ridge 22 not only seals by virtue of the compression of the fibers and close engagement therewith, which is brought about by the nut 15, but the ridge also seals by virtue of the various steps or shoulders formed between the lumber and head of the bolt. That is, any leakage which passes the ridge 22 must first leak down to the apex 23 of the ridge and then leak back upward over the ridge of lumber immediately adjacent the body of the bolt.

It should be noted that the nut 15 and threads 16 constitute a force multiplying device for effecting the sealing engagement between the head and lumber, as well as a means for permanently securing these parts in sealing engagement. Any kind of nut, including lock nuts or lock washers, may be employed for this purpose.

It will thus be observed that I have invented an improved bolt, which has peculiar advantages when used in connection with refrigerator cars, for the reason that it is highly desirable to avoid leakage of water into the holes about the bolts in such cars. The present bolts effect a substantial improvement in the life and serviceability of cars which are equipped with such bolts, and the bolts are adapted to prevent leakage and enable the lumber to give good service for a much longer period of time than the devices of the prior art. When the present bolts are employed with relatively hard wood, the heads of the bolts provide a perfectly waterproof seal, which prevents water from leaking through the floor, damaging the installation and rotting the lumber.

It is of the utmost importance that the insulation of refrigerator cars be kept dry in order to maintain the insulating value, and particularly on account of the fact that the insulation is enclosed between the walls of the car where it will not dry out very quickly should it ever become wet.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim is new and desire to secure by Letters Patent of the United States, is:

1. A watertight wood bolt, comprising a bolt shank having a substantially circular head adapted to be embedded in the wood of a member secured by said bolt to the edge of said head, force multiplying means carried by the end of said bolt for drawing the head of said wood bolt into engagement with said wood, said head being provided on its lower side with an annular sealing member of substantially uniform cross section and formed with a camming surface on the side adjacent said shank, and adapted to effect uniform sealing engagement with said wood by camming the wood under said head and confining the adjacent wood under said head when said bolt is drawn up by said force multiplying means.

2. A watertight wood bolt, comprising a bolt shank having a substantially circular head adapted to be embedded in the wood of a member secured by said bolt, to the edge of said head, force multiplying means carried by the end of said bolt for drawing the head of said wood bolt into engagement with said wood, said head being provided on its lower side with an annular sealing member of substantially uniform cross section and formed with a camming surface on the side adjacent said shank, and adapted to effect uniform sealing engagement with said wood by camming the wood under said head and confining the adjacent wood under said head when said bolt is drawn up by said force multiplying means, and means carried by the shank of said bolt for engagement with the walls of a bore in said wood to prevent rotation of said bolt and maintain sealing engagement of the head in the same position, during the drawing up of said bolt.

3. A watertight bolt comprising a round shank, formed with a threaded end, and provided with a non-circular portion, said shank having sloping surfaces between said non-circular portion and the round part of said shank, and a head formed with an upper slightly convex surface and a lower upwardly sloping surface, the head tapering in thickness towards its outer edge, and being provided on its lower side with a sealing member of annular form, and provided with an inner camming surface adjacent said shank, and adapted to engage the wood of a member secured by said bolt when said bolt is drawn up, said sealing member being adapted to effect sealing engagement by confining the wood beneath said head and compressing said wood into form complementary to the lower side of said head.

4. A watertight bolt for wood, comprising a shank provided with a threaded end and a threaded member for drawing the bolt head into sealing engagement with a wood member to be secured by said bolt, a substantially circular head carried by the other end of said shank and adapted to be drawn into the wood by said threaded member, and a watertight sealing member carried by the lower side of said head and comprising an annular member having a camming surface adapted to confine the wood adjacent said shank underneath said head and to form a complementary surface in the wood under the head under compression when said bolt is drawn up.

5. In a wooden structure, the combination of a supporting frame member with a wooden layer adapted to be secured to the frame member, said wooden layer having a plane upper surface and a cylindrical bore through the same, with a securing member for securing said wooden layer to said frame member, said securing member having a shank in said bore and having a thin circular head tapering to a relatively sharp edge, said head engaging the wood fibers about the top of said bore to confine the cut fibers under said head, and said head compressing said fibers to locate said head substantially flush with said plane surface and to effect a watertight joint about said head without projections, and a water-sealing formation carried by the lower side of said head and adapted to form a complementary recess in the wood.

6. In a wooden structure, the combination of a supporting frame member with a wooden layer adapted to be secured to the frame member, said wooden layer having a substantially plane upper surface and a cylindrical bore through the same, with a securing member for securing said wooden layer to said frame member, said securing member having a shank in said bore and having a head adapted to be drawn into the wood substantially flush with the surface of said wooden layer, said head having an edge adapted to be located substantially at the surface of said wooden layer, and said head having a body, the major portion of which is located in said wooden layer below said edge to compress the fibers of the wood, confine the fibers of the wood adjacent said bore underneath said head, and effect a substantially watertight joint between said head and wooden layer.

In witness whereof, I hereunto subscribe my name this 19th day of November, 1929.

CLAUD E. McMULLIN.